(12) United States Patent
Early et al.

(10) Patent No.: US 8,469,643 B2
(45) Date of Patent: Jun. 25, 2013

(54) LADING TIE ANCHOR LINK WITH ENHANCED BANDING CONTACT SURFACE

(75) Inventors: David R. Early, Carol Stream, IL (US); Rudolph E. Nadherny, Golden, MO (US); Barry T. Glass, Crest Hill, IL (US)

(73) Assignee: Ireco, LLC, Bensenville, IL (US)

( * ) Notice: Subject to any disclaimer, the term of this patent is extended or adjusted under 35 U.S.C. 154(b) by 470 days.

(21) Appl. No.: 12/555,972

(22) Filed: Sep. 9, 2009

(65) Prior Publication Data
US 2009/0324357 A1 Dec. 31, 2009

Related U.S. Application Data

(60) Division of application No. 11/116,839, filed on Apr. 28, 2005, now Pat. No. 7,621,706, which is a continuation-in-part of application No. 29/204,976, filed on May 6, 2004, now Pat. No. Des. 523,326.

(51) Int. Cl.
B60P 7/08 (2006.01)

(52) U.S. Cl.
USPC .......................................... 410/106; 410/116

(58) Field of Classification Search
USPC .... 410/97, 101, 106, 107, 111, 116; 248/499; 24/265 CD
See application file for complete search history.

(56) References Cited

U.S. PATENT DOCUMENTS

| | | | |
|---|---|---|---|
| 2,170,913 A | 8/1939 | Rowe | |
| 2,226,667 A | 12/1940 | Love | |
| 2,587,882 A | 3/1952 | Oakley | |
| 2,591,986 A | 4/1952 | Weiss et al. | |
| 2,596,855 A | 5/1952 | Johnson | |
| 2,753,816 A | 7/1956 | Oakley | |
| 2,803,201 A | 8/1957 | Johnson et al. | |
| 2,839,013 A | 6/1958 | Gunnell et al. | |
| 2,843,060 A | 7/1958 | Sladek | |
| 2,855,866 A | 10/1958 | Adler | |
| 2,882,837 A | 4/1959 | Methe et al. | |
| 2,897,771 A | 8/1959 | Johnson | |
| 2,930,330 A | 3/1960 | Jensen et al. | |
| 2,939,406 A | 6/1960 | Wilkoff | |
| 2,989,010 A | 6/1961 | Wilkoff | |
| 3,089,436 A | 5/1963 | Buckley | |
| 3,125,036 A | 3/1964 | Reynolds | |
| 3,224,385 A | 12/1965 | Elsner | |
| 3,233,319 A | 2/1966 | Jensen et al. | |

(Continued)

OTHER PUBLICATIONS

Ireco Inc. "Flexi" Lading Tie Anchor, 1962.

(Continued)

*Primary Examiner* — Stephen Gordon
(74) *Attorney, Agent, or Firm* — Cook Alex Ltd.

(57) ABSTRACT

A two-piece anchor assembly has a retainer and an interlocking link. The link is a unitary component that is formed by a single forging step. The link is secured to the floor of a railway flatcar by the retainer. A steel band is connected at one end to a load bearing surface of the link of a first anchor assembly and at another end to a load bearing surface of the link of a second anchor assembly. A tensile force is then applied to the steel banding and crimped with a clip in order to secure cargo. The load bearing surface has an enhanced banding radius, which reduces the risk of band breakage when the steel band is subjected to a high tensile force by preventing "creasing" at contact locations.

25 Claims, 5 Drawing Sheets

U.S. PATENT DOCUMENTS

| | | |
|---|---|---|
| 3,814,029 A | 6/1974 | McNally et al. |
| 3,831,532 A | 8/1974 | Smith et al. |
| 3,958,516 A | 5/1976 | Cheung |
| 4,060,036 A | 11/1977 | Palms |
| 4,062,297 A | 12/1977 | Snyder et al. |
| 4,168,667 A | 9/1979 | Loomis |
| 4,273,487 A | 6/1981 | McLennan |
| 4,297,962 A | 11/1981 | Johnson, Jr. |
| 4,360,299 A | 11/1982 | Nadherny et al. |
| 4,373,841 A | 2/1983 | Adler et al. |
| D281,860 S | 12/1985 | Nadherny |
| 4,592,686 A | 6/1986 | Andrews |
| 4,715,754 A | 12/1987 | Scully |
| 4,812,093 A | 3/1989 | Millar, Jr. |
| 4,846,610 A | 7/1989 | Schoenleben |
| D309,251 S | 7/1990 | Palmer |
| 5,052,869 A | 10/1991 | Hansen, II |
| 5,173,996 A | 12/1992 | Chou |
| 5,180,263 A | 1/1993 | Flowers, Jr. |
| 5,330,300 A | 7/1994 | Jones et al. |
| 5,848,865 A | 12/1998 | Beals |
| 5,855,045 A | 1/1999 | Miura |
| 5,934,849 A | 8/1999 | Haire |
| 5,943,963 A | 8/1999 | Beals |
| D415,951 S | 11/1999 | Kraine |
| 6,030,158 A | 2/2000 | Tatina et al. |
| 6,450,105 B1 | 9/2002 | Glass |
| 6,592,310 B2 | 7/2003 | Hyp et al. |
| 6,651,576 B1 | 11/2003 | Lo |
| 6,655,886 B2 | 12/2003 | Grandy |
| D523,326 S | 6/2006 | Naderney et al. |
| 7,621,706 B2 * | 11/2009 | Early et al. .......... 410/106 |

OTHER PUBLICATIONS

Portec Lading Tie Anchor, circa 2001.

* cited by examiner

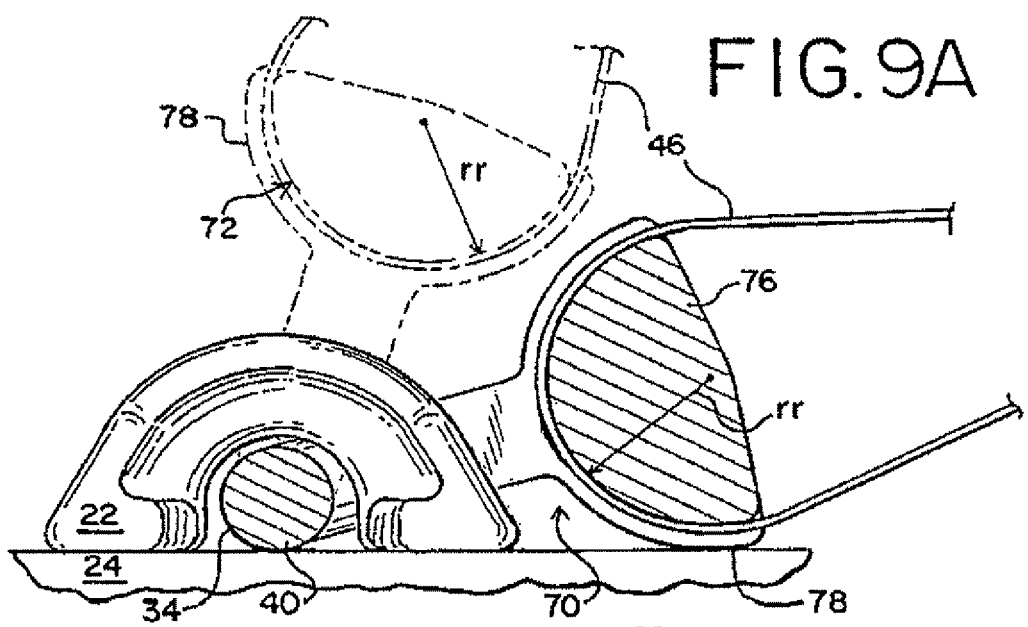
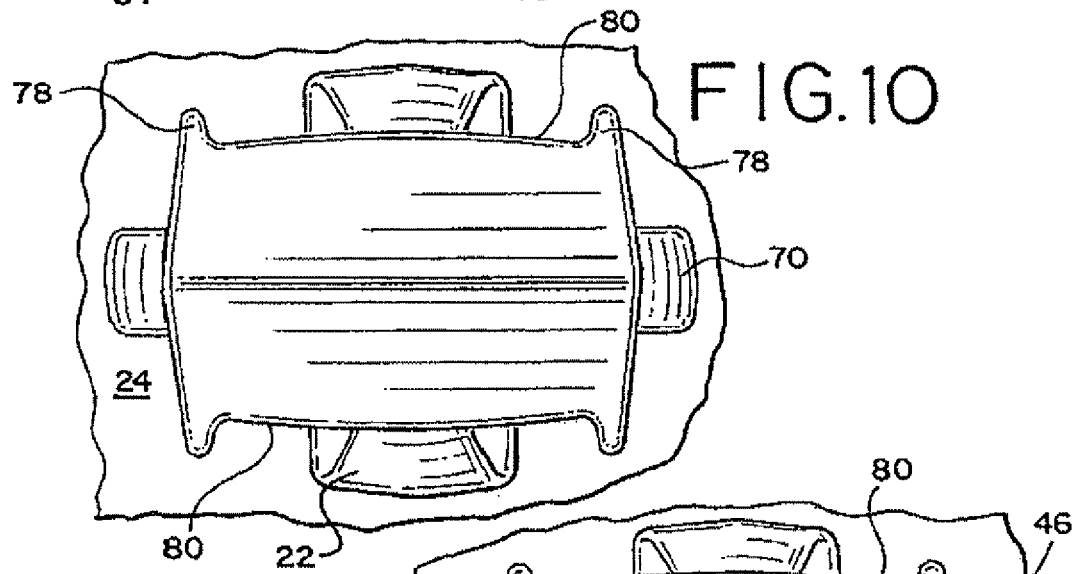
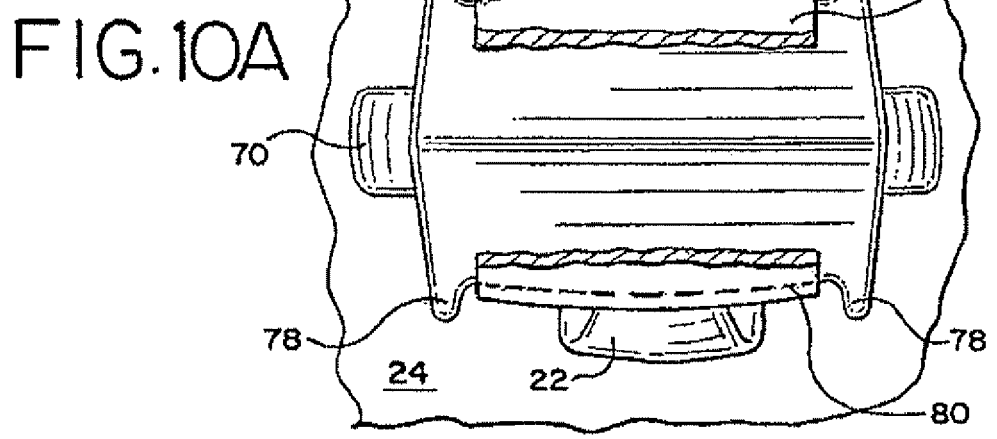

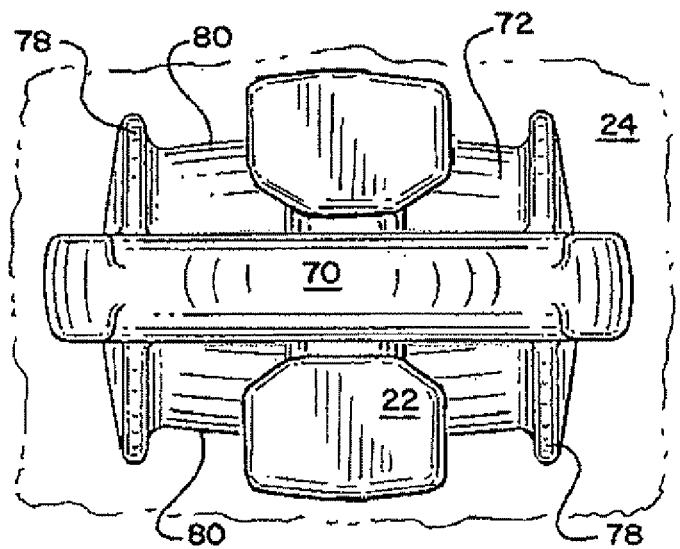
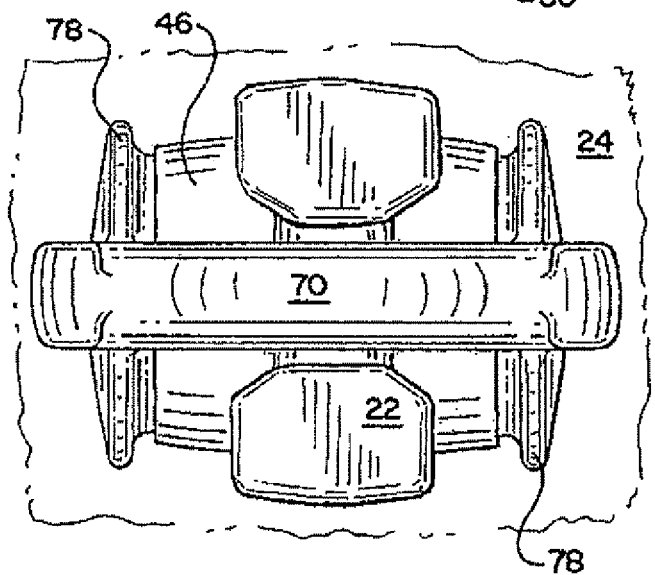
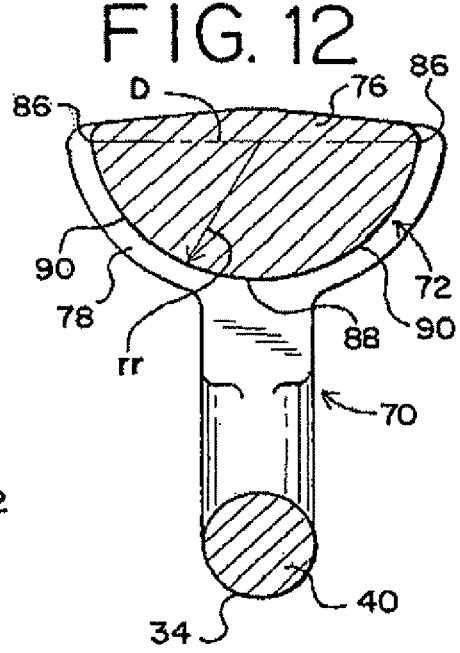
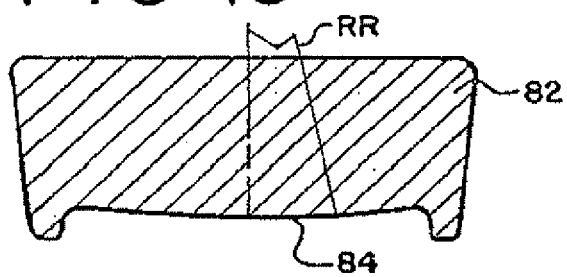

US 8,469,643 B2

LADING TIE ANCHOR LINK WITH ENHANCED BANDING CONTACT SURFACE

CROSS REFERENCE TO RELATED APPLICATION

This is a divisional application of application Ser. No. 11/116,839, filed Apr. 28, 2005, now U.S. Pat. No. 7,621,706, which is a continuation-in-part application of application Ser. No. 29/204,976, filed May 6, 2004, now U.S. Design Pat. No. D523,326.

BACKGROUND OF THE INVENTION

1. Field of the Invention

This invention generally relates to an anchor for securing cargo, using metal banding, onto railway cars including flatcars, center beams, gondolas and log cars. An assembly comprising an interlocking retainer and link is used to decrease the occurrence of banding breakage. The enhanced radius of the link provides a greater load bearing area for engaging the banding, thereby reducing the stress present in the banding when securing heavier and/or top-heavy loads, such as steel pipe. Special application is found for this approach in securing heavy loads transported by flatcar.

2. Description of Related Art

Heavy loads, such as steel pipe and the like, can be transported in a number of ways, including by flatcar. In order to prevent the cargo from becoming damaged, it is necessary to provide securing means. Various known securing means include plastic strapping, cord strapping, and steel banding. The preferred way to secure a heavy load is to bind it with a plurality of steel bands or straps. In practice, each band is connected to the floor or side frame of the flatcar by an anchor assembly at opposite sides of the cargo. Once the band is connected to the anchors and tightened, a crimp seal typically is applied to maintain an appropriate tension level during transport.

Many types of anchor assemblies are well-known. The "Flexi" anchor assembly made by Ireco LLC is an example of a known device. FIGS. 1-4 illustrate a device 20 according to the two-piece "Flexi" anchor assembly. The "Flexi" assembly 20 comprises a steel retainer 22 which is affixed to the floor or frame 24 of a flatcar and a steel link 26 which is movably connected to the retainer 22. The arcuate retainer 22 takes the form of an inverted "U" which can be welded to the floor or frame 24 of the flatcar. The link 26 is triangular and defines a generally triangular central aperture 28 which interlocks the retainer 22. The anchor assembly 20 is configured such that the retainer 22 passes through the central aperture 28 of the link 26 and effectively hooks the link 26 to a floor surface or a frame area 24 of the flatcar.

One side 30 of the link 26 includes a banding portion 32, while the end 34 defined by the intersection of the other two sides 36 engages the retainer 22. FIGS. 1 and 2 show that the banding portion 32 includes a lateral convex curvature surface 38 facing the central aperture 28. This part of the banding portion 32 has a radius of curvature "R" of approximately five inches. FIGS. 3 and 4 show that the cross section 40 of the retainer-engaging end 34 is circular, while the cross section 42 of the banding portion 32 approximates a rectangle with curved corners. The two corners 44 nearest the central aperture 28 have a 0.25 inch radius of curvature "r".

In use, a securing means, such as a steel band 46, is passed through the aperture 28 of the link 26, so as to engage the banding portion 32. Banding surface 38 is sufficiently wide to accept a 1.25 inch or 2 inch steel band. When tension is applied to the steel band 46, it tightens against the banding portion 32 and deforms in part to take the shape of the lateral convex curvature surface 38. FIG. 2 shows in broken lines that the link 26 is free to take an angled orientation when the steel band 46 engages the banding surface 38. FIG. 2 also shows in broken lines the use of a cable or wire 48 extending from an end of the link between two sides 30 and 36.

The steel band 46 engages a portion of the cross-sectional perimeter of the banding portion 32 of the link 26, best shown in broken lines in FIG. 3. The surface of the banding portion 32 along the link 26 generally conforms to the opposing, parallel surfaces 50 of the link 26 and the lower surface 52. The magnitude of the curvature of the steel band 46 about the banding portion 32 is referred to herein as the banding radius "r". It can be seen that the banding radius "r" in FIG. 3 varies due to the irregular shape of the banding portion 32. The lower curved corners 44 each subject the steel band 46 to a relatively sharp curve, which can result in creasing of the steel band 46. FIG. 3 also shows the link 26 flat against the floor surface 24 of the flatcar, in a stored position when it is not in use.

It will be appreciated that a large tensile force must be applied to the steel bands in order to secure the cargo. One problem associated with prior art anchor assemblies which we now have determined to be important is that, when the steel bands are subjected to such large tensile forces, especially when combined with forces that result from even slight shifting of lading weight during the rocking movement of rail transport, there is the possibility that metal fatigue will cause the bands to fail. The movement of rail transport can cause repetitive back and forth bending at locations where the banding engages a corner or tight radius.

We have determined that the banding radius of anchor assemblies as illustrated in FIGS. 1-4 is inadequate, especially when used to secure top-heavy or uneven loads, such as a load of steel pipes, the steel band can become creased along the curved corners of the banding portion, which creases are subjected to dynamic bending forces over time and subsequently break. This is especially problematic when the cargo must be transported a great distance. The steel band can withstand only a certain stress level and will deform and fail once that level is exceeded. It is thought that the critical stress level decreases due to the combination of creasing, dynamic bending forces, and metal fatigue associated with prior art anchor assemblies. As large tensile forces are required to safely secure heavier loads, and as heavy unbalanced loads need to be transported by rail over long distances, an anchor assembly which reduces the risk of band breakage is needed.

FIGS. 5 and 6 illustrate examples of previous attempts to solve these band breakage problems. As shown, both anchors 56 and 58 provide a right cylindrical element 60 having a larger banding portion than that illustrated in FIGS. 1-4, while also providing an increased banding radius. The cylindrical element 60 is separate from the link body 62 and mounted thereto by a bolt 64, which is itself secured to the link body 62 by a threaded nut 66.

It will be appreciated that, in lading anchors for steel bands, the stress in the steel band is inversely proportional to the area of the band which engages the banding portion of the link. Hence, for a given tensile force applied to the steel band, a larger area of engagement between the band and the banding portion of the anchor will allow for a greater force distribution, which decreases the stress to which the steel band is subjected. An increased banding radius (perpendicular to the axis of a right cylinder such as element 60 of FIGS. 5 and 6) is also desirable because it reduces the risk of creasing the steel band which, when combined with dynamic bending forces, leads to metal fatigue and eventually failure at heavier loads. Accordingly, the anchor assemblies of FIGS. 5 and 6 attempt to decrease band breakage by providing a larger banding portion and right cylindrical banding radius. The anchor assemblies of FIGS. 5 and 6 are relatively expensive because they require several components (i.e. a cylinder, a bolt, and a nut) to achieve their goal.

Accordingly, a general object and aspect of the present invention is to provide an improved anchor assembly for use with a railway car such as a flatcar, a center beam car, a gondola car, a log car and the like.

Another object or aspect of this invention is to provide an improved anchor assembly which reduces the risk of band breakage for heavier loads and those having an unbalanced or high center of gravity without increasing the number of components of a current anchor assembly.

Another object or aspect of the present invention is to provide an improved anchor assembly and method that address metal banding breakage problems for top-heavy lading loads, including those encountered during long-distance rail transport.

Other aspects, objects and advantages of the present invention, including the various features used in various combinations, will be understood from the following description according to preferred embodiments of the present invention, taken in conjunction with the drawings in which certain specific features are shown.

SUMMARY OF THE INVENTION

In accordance with the present invention, an anchor assembly reduces the risk of band breakage at large tensile forces by providing a link with a large load bearing surface having an enhanced banding portion configuration which decreases "creasing" of metal banding that is anchored by the assembly and decreases bending stress transmitted to the steel band at the anchor location during rail transport, even over long distances and with lading loads having a relatively high center of gravity.

Notably, a steel link according to the present invention is made, typically by forging or casting, as a single component, in contrast to the multiple components used in the prior art anchor assemblies illustrated in FIGS. 5 and 6. It is estimated that a link according to the present invention costs approximately half as much, or less, to manufacture and assemble as the FIGS. 5 and 6 links, while achieving performance characteristics at least as advantageous as those of FIG. 5 or 6.

BRIEF DESCRIPTION OF THE DRAWINGS

FIG. 9A is a right side cross-sectional view of the link of FIG. 7, with the retainer in elevation, showing the link in a stored position and a separate broken line illustration of the link in use;

FIG. 10 is a top plan view of the anchor assembly as shown in FIG. 8;

FIG. 10A is a top plan view of the anchor assembly as shown in FIG. 8, with an applied steel band;

FIG. 11 is a bottom plan view of the anchor assembly as shown in FIG. 8;

FIG. 11A is a bottom plan view of the anchor assembly of FIG. 7, with an applied steel band;

FIG. 12 is a cross-sectional view of the improved link of FIG. 7, along the line 12-12 of FIG. 8; and FIG. 13 illustrates a surface which may be rotated in order to define the shape of the large load bearing surface and optional guide flanges of the improved link of FIG. 7, along the line 13-13 of FIG. 9.

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention and virtually any appropriate manner.

Figure 1:
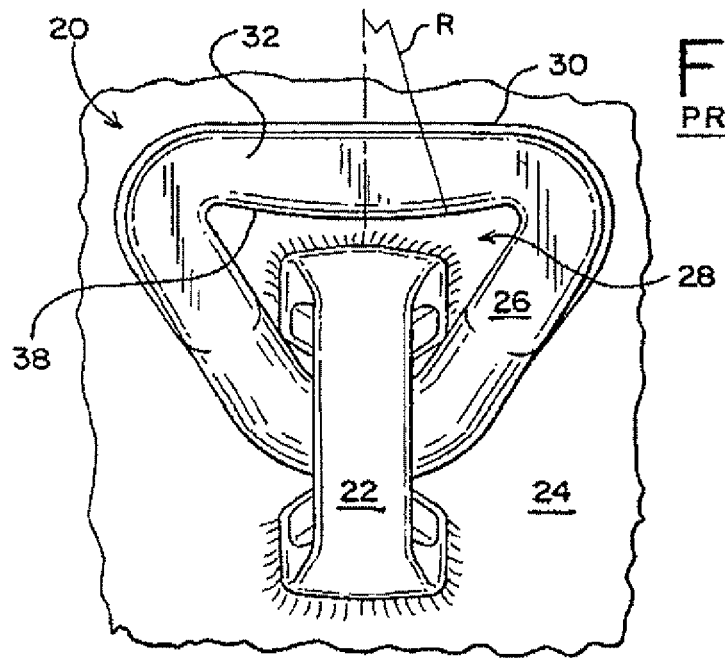
FIG. 1 is a top plan view of a prior art anchor assembly in a stored position.
Figure 4:
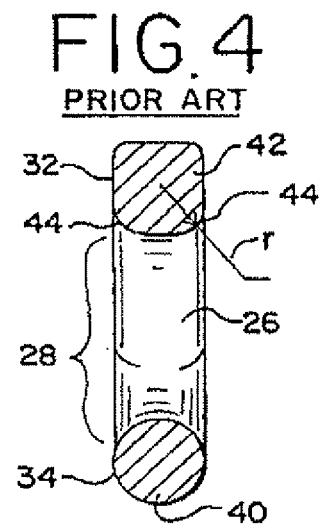
FIG. 4 is a cross-sectional view of the link of the anchor assembly shown in FIG. 1.
Figure 2:
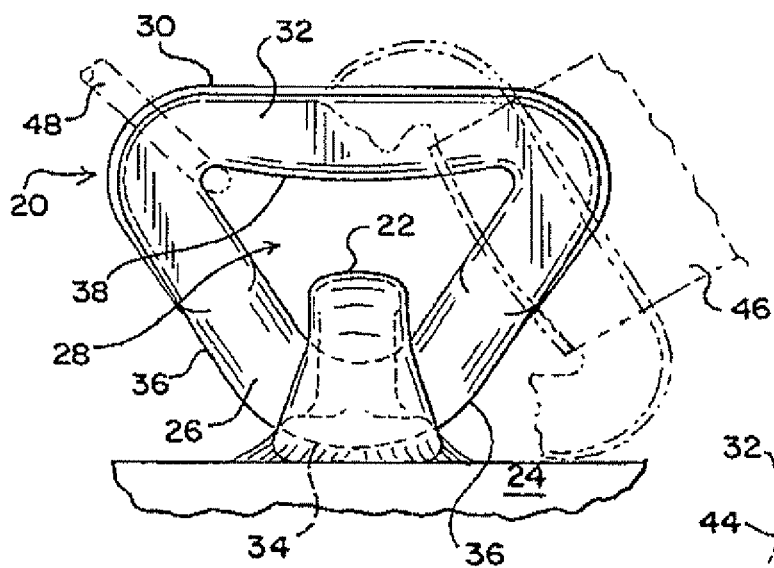
FIG. 2 is a front elevational view of the anchor assembly of FIG. 1, with broken lines to illustrate the link-retainer connection and to show the application of a wire or a steel band.
Figure 7:
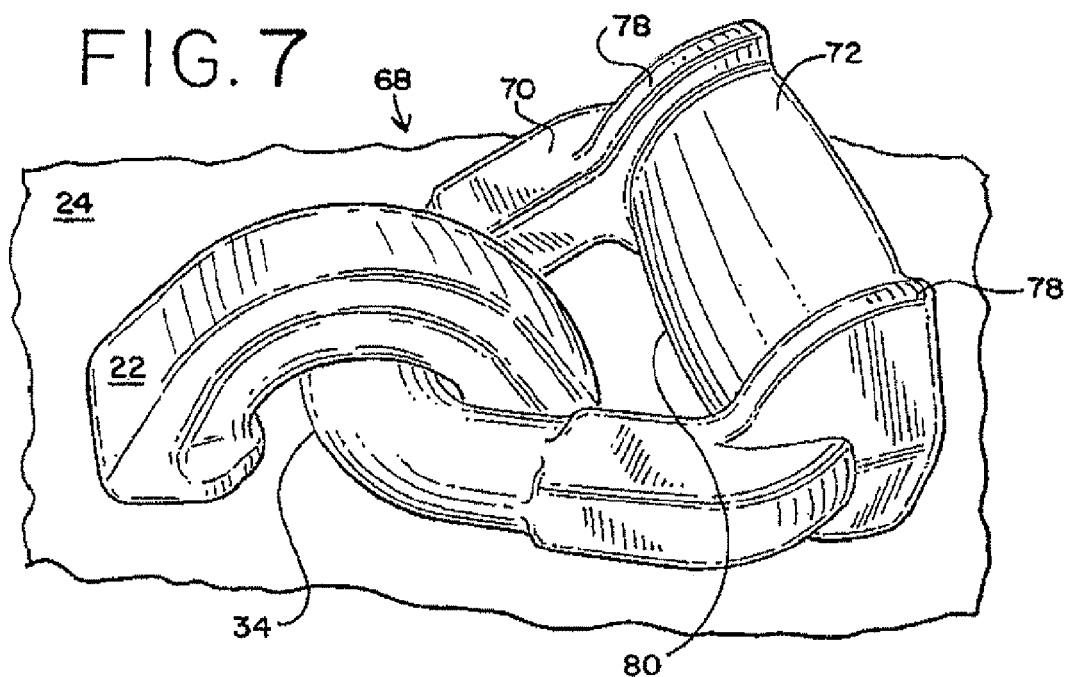
FIG. 7 is a right side perspective view of an anchor assembly having an improved link according to the present invention.
Figure 9:
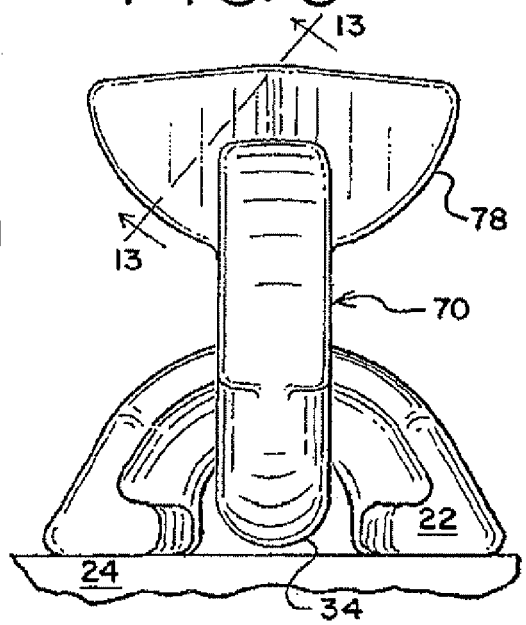
FIG. 9 is a right side elevational view of the anchor assembly of FIG. 7.

FIG. 7 shows an anchor assembly 68 having an improved link 70 according to the present invention. The anchor assembly 68 includes the retainer 22 of FIG. 1, which interlocks the improved link 70 according to the above description of the prior art anchor assembly 20. The improved link 70 functions to receive metal banding in the general sense of the prior art link 26 of FIG. 1. However, as perhaps best illustrated in FIG. 9A, the large load bearing surface 72 of link 70 is larger than the banding portion 32 and allows for a greater banding radius "rr". Preferably, the surface 72 has a banding radius "rr" which is between approximately one-half inch and approximately one and one-half inches. In a preferred embodiment, this radius "rr" is on the order of about one inch. FIG. 9A shows that the large load bearing surface 72 has a cross-sectional area 76 which is substantially larger than the nominal cross-sectional area 40 of the link 70 at other points, such as at the retainer-engaging end 34. In contrast, FIG. 4 shows that the cross-sectional area 42 of the banding portion 32 of the prior art link 26 is comparable to the cross-sectional area 40 at the retainer-engaging end 34.

Figure 3:
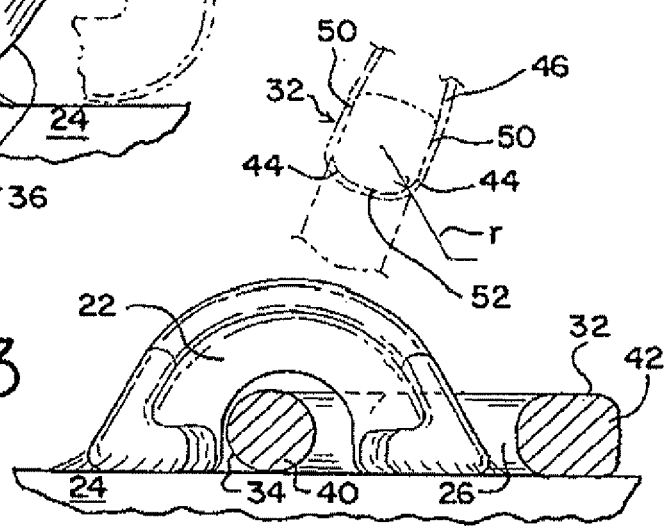
FIG. 3 is a right side cross-sectional view of the link of FIG. 1, with the retainer in elevation, showing the link in a stored position and a broken line illustration of a steel band applied to the link.

FIG. 9A shows that the large load bearing surface 72 approximates a smooth arc along radius "rr", whereas the banding portion 32 illustrated in FIG. 3 is more U-shaped and creates isolated zones 44 with small banding radii "r". Accordingly, due to the improved link 70 of the present invention, the tensile stress in the steel band 46 is spread over a greater surface area, there is a reduction in "creasing" along the radius "rr" when compared with along radii "r", and the occurrence of band breakage at heavier and/or relatively unstable loads is decreased. Furthermore, it is thought that, under typical transport conditions, an improved link according to the present invention significantly reduces or virtually eliminates band breakage by limiting metal fatigue which, in prior art anchor assemblies, causes the critical stress level of the metal banding to drop below the amount resulting from the applied tensile force.

In an alternate embodiment, the improved link 70 can include two guide flanges 78 which are shown disposed along the sides of the large load bearing surface 72. The flanges 78 extend beyond or flank the large load bearing surface 72, as best shown in FIGS. 10 and 10A, and guide the steel band 46 when it is first applied to the link 26, by preventing it from moving laterally beyond the bounds of the large load bearing surface 72.

As shown in FIG. 9A, in the stored position, the guide flanges 78 can be useful in preventing the large load bearing surface 72 from coming into contact with the floor surface 24 of the flatcar. Accordingly, the flanges 78 can assist in having the large load bearing surface 72 remain cleaner than when flanges are omitted and allow a true fit for the steel band 46, when engaged. Also, unlike prior art links which will freeze to the railway car deck or frame under winter conditions, flanges 78 minimize the risk of such freezing, due largely to the minimal surface of the unit according to the invention that engages the deck or frame of the car.

The improved link 70 may include a lateral, convex curvature 80 along the large load bearing surface 72, in which event the curvature 80 will have a minimum radius "RR". Radius "RR" can be substantially constant throughout the transverse curvature of radius "rr". FIG. 13 shows the shape of a surface 82 which may be rotated through an obtuse angle in order to form the large load bearing surface 72 and guide flanges 78 when lateral radius "RR" is substantially constant. The arc 84 corresponding to the large load bearing surface 72 preferably has a minimum radius of curvature "RR" of between approximately five and one-half inches and approximately fifteen inches along the surface 72. More preferably, the minimum radius of curvature "RR" is within a range of approximately eight and approximately fourteen inches. A most preferred minimum radius of curvature "RR" is on the order of about ten inches.

Figure 8:
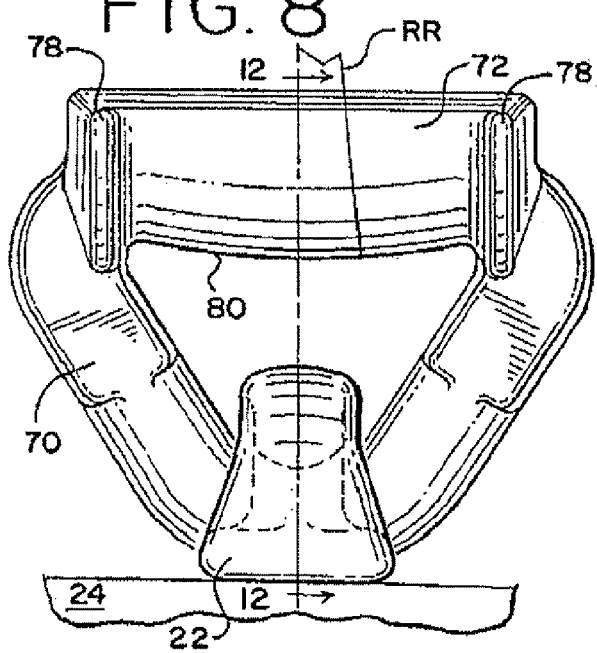
FIG. 8 is a front elevational view of the anchor assembly of FIG. 7, with broken lines to illustrate the link-retainer connection.

Alternatively, lateral radius "RR" can vary throughout some or all of the transverse curvature of radius "rr". In such a situation, the minimum lateral radius "RR" noted above will occur at only some locations, or perhaps only one location, along the transverse radius "rr". In a typical approach to providing a varying lateral curvature, the central lateral radius "RR" will exhibit such minimum radius, as shown in FIG. 8 and FIG. 13. The lateral radius "RR" at other locations along the lateral curvature 80 will be greater than the minimum radius.

As an illustration of a varying lateral radius "RR", at the locations where transverse diameter "D" intersects the lateral surface of curvature 82, such as at 86 in FIG. 12, the lateral radius "RR" is nominally infinite, with the lateral curvature at this location approaching or reaching a straight line. In this illustration, there is a gradual reduction in the respective lateral radii "RR" values between the minimum lateral radius location or radii locations and the straight-line or approximate straight-line lateral radius or radii. Thus, the value of lateral radius "RR" at intersections 90 is greater than the value of the lateral radius "RR" at mid-point intersection 88 and is less than the value of lateral radius "RR" at diameter intersections 86. Substantially this same pattern of lateral radius "RR" values variation can vary in a gradually decreasing manner between intersections 90 and mid-point intersection 88 and in a gradually increasing manner between intersections 90 and diameter intersections 80.

When a sufficient tensile force is applied to the steel band 46, it will beneficially deform to match the lateral curvature "RR" of the large load bearing surface 72, which provides a "self-centering" function that prevents lateral shifting of the steel band 46 and helps secure the cargo. It will be seen that the radius of curvature of the transverse radius "RR" is preferably greater than the radius "R" of the prior art link, because an adequate "self-centering" function is achieved, with less deformation of the steel band 46 than with radius "R" of the link of FIGS. 1-4.

In a preferred embodiment, the large load bearing surface 72 preferably defines a symmetrical arc. For example, FIG. 12 shows that the large load bearing surface 72 can define an arc which extends above transverse diameter "D" and is greater than 180° and not more than 250°, preferably approximately 200°. However, a greater or lesser arc angle than that illustrated in FIG. 12 or a non-symmetrical curve or arc are also contemplated by the present invention.

Figure 5:
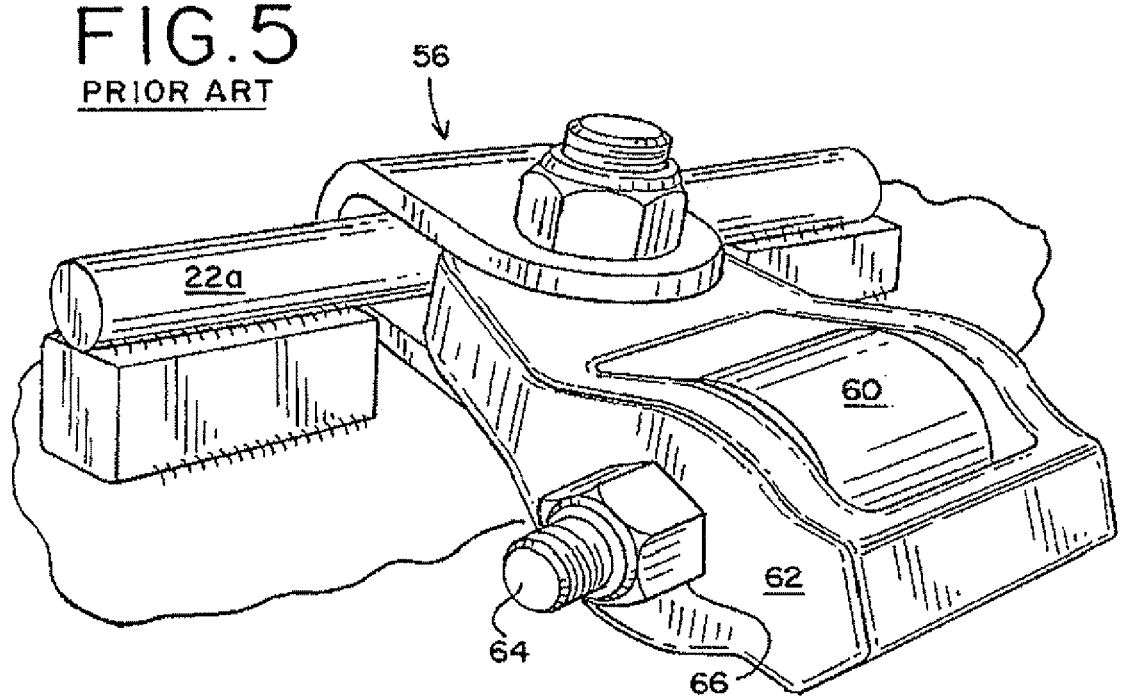
FIG. 5 is a perspective view of another prior art anchor assembly having an increased banding radius.
Figure 6:
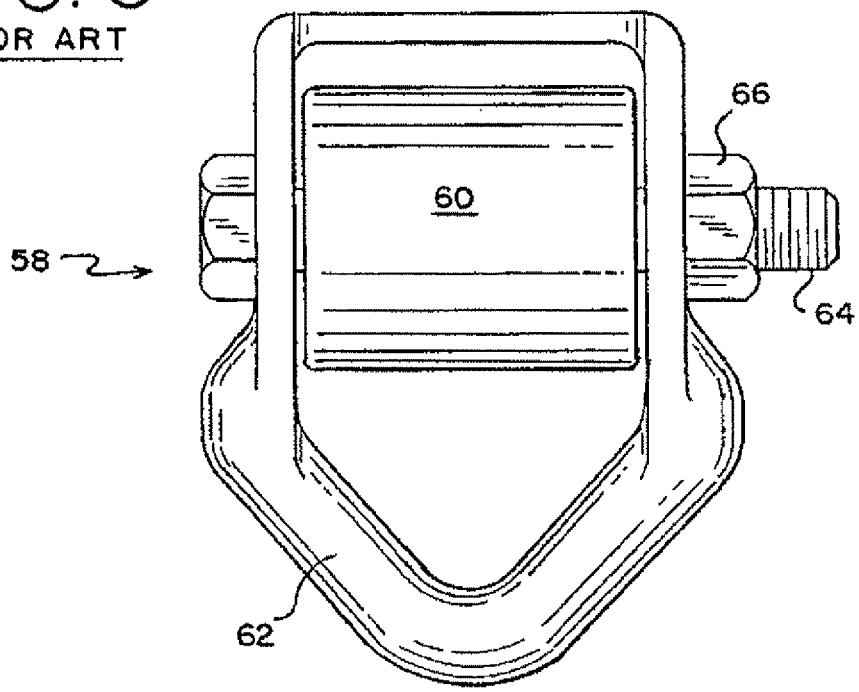
FIG. 6 is a front elevational view of a further prior art anchor assembly having an increased banding radius.

In a preferred embodiment, the top of cross sectional area 76 (i.e. the two sloped surfaces closing the area generally above transverse diameter "D") defines a symmetrical 166° angle. The exact shape of this portion is not critical, because it does not engage the steel banding in operation. As such, a complete cylindrical surface, such as 60 in FIGS. 5 and 6 is unnecessary, because the steel band 46 will not engage much of the upper surface. Thus, a shape such as that illustrated in FIG. 12 is preferred, because unnecessary material is avoided without degrading performance.

Importantly, the improved link 70 is a unitary structure. A link 70 according to the present invention may be formed in a single drop forging step and there is no need for later assembly of separate parts. Such an integral construction also provides a very durable link which is less susceptible to breakage or unintended disassembly.

Example

In a long-distance road test of about 1,000 miles along a commercial rail route, a link according to the present invention was compared to the prior art link of FIGS. 1-4 and the alternate retainer 22a which can be seen in FIG. 5. In the road test, three flatcars with thirty-six attachment points (i.e. eighteen steel bands) each were loaded with steel pipe according to Vibration Isolation Connection requirements of the American Association of Railroads (AAR).

The first flatcar used prior art links according to FIGS. 1-4, the second connected the steel bands directly to the alternate retainers 22a illustrated in FIG. 5, and the third flatcar used links according to the present invention. It was found that two of the eighteen steel bands used with each of the first two flatcars broke, whereas none of the steel bands used with the third flatcar broke during the entire length of this run.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:
1. A railway car lading tie anchor link comprising:
   a plurality of sides, an intersection area of two of said sides being a retainer-engaging portion for interlocking engagement with a retainer on a railway car; and
   a large load bearing surface opposite said intersection area which is configured for engaging a length of metal banding, wherein said large load bearing surface has a mini- mum banding radius of at least approximately one inch, is unitarily formed with the lading tie anchor link, and includes a lateral, convex curvature having a minimum radius of curvature in a range of approximately five and one-half inches and approximately fifteen inches.

2. The lading tie anchor link of claim 1, wherein said lateral, convex curvature has a constant radius of curvature along said large load bearing surface.

3. A railway car lading tie anchor link comprising:
a plurality of sides, an intersection area of two of said sides being a retainer-engaging portion for interlocking engagement with a retainer on a railway car; and
a large load bearing surface opposite said intersection area which is configured for engaging a length of metal banding, wherein said large load bearing surface has a minimum banding radius of at least approximately one inch, is unitarily formed with the lading tie anchor link, and includes a varying lateral, convex curvature having a minimum radius of curvature at one location along said large load bearing surface and a maximum radius of curvature at another location along said large load bearing surface.

4. The lading tie anchor link of claim 3, wherein the minimum radius of curvature is between approximately five and one half inches and approximately fifteen inches, and wherein the maximum radius of curvature generally equates to a straight line.

5. The lading tie anchor link of claim 1, wherein the large load bearing surface extends between lateral ends, and further including a guide flange disposed at or adjacent to each lateral end of said large load bearing surface.

6. The lading tie anchor link of claim 1, wherein said large load bearing surface extends for greater than 180° and for not more than about 250°.

7. A railway car lading tie anchor link comprising:
a plurality of sides, an intersection area of two of said sides being a retainer-engaging portion for interlocking engagement with a retainer on a railway car; and
a large load bearing surface opposite said intersection area which is configured for engaging a length of metal banding, wherein said large load bearing surface has a minimum banding radius of at least approximately one inch, is unitarily formed with the lading tie anchor link, and defines an arc having a symmetrical angle of approximately 200°.

8. The lading tie anchor link of claim 1, wherein said intersection area has a nominal cross-sectional area and said large bearing surface has a cross-sectional area substantially larger than said nominal cross-sectional area.

9. A railway car lading tie anchor link comprising:
a plurality of sides, an intersection area of two of said sides being a retainer-engaging portion for interlocking engagement with a retainer on a railway car, the retainer-engaging portion having a nominal cross-sectional area; and
a large load bearing surface opposite said intersection area which is configured for engaging a length of metal banding, wherein said large load bearing surface has a cross-sectional area at least twice as large as said nominal cross-sectional area, is unitarily formed with the lading tie anchor link, and includes a lateral, convex curvature having a minimum radius of curvature in a range of approximately five and one-half inches and approximately fifteen inches.

10. The lading tie anchor link of claim 9, wherein said lateral, convex curvature has a constant radius of curvature along said large load bearing surface.

11. A railway car lading tie anchor link comprising:
a plurality of sides, an intersection area of two of said sides being a retainer-engaging portion for interlocking engagement with a retainer on a railway car, the retainer-engaging portion having a nominal cross-sectional area; and
a large load bearing surface opposite said intersection area which is configured for engaging a length of metal banding, wherein said large load bearing surface has a cross-sectional area at least twice as large as said nominal cross-sectional area, is unitarily formed with the lading tie anchor link, and includes a varying lateral, convex curvature having a minimum radius of curvature at one location along said large load bearing surface and a maximum radius of curvature at another location along said large load bearing surface.

12. The lading tie anchor link of claim 11, wherein the minimum radius of curvature is between approximately five and one half inches and approximately fifteen inches, and wherein the maximum radius of curvature generally equates to a straight line.

13. The lading tie anchor link of claim 11, wherein the large load bearing surface extends between lateral ends, and further including a guide flange disposed at or adjacent to each lateral end of said large load bearing surface.

14. The lading tie anchor link of claim 11, wherein said large load bearing surface extends for greater than 180° and for not more than about 250°.

15. A railway car lading tie anchor link comprising:
a plurality of sides, an intersection area of two of said sides being a retainer-engaging portion for interlocking engagement with a retainer on a railway car, the retainer-engaging portion having a nominal cross-sectional area; and
a large load bearing surface opposite said intersection area which is configured for engaging a length of metal banding, wherein said large load bearing surface has a cross-sectional area at least twice as large as said nominal cross-sectional area, is unitarily formed with the lading tie anchor link, and defines an arc having a symmetrical angle of approximately 200°.

16. The lading tie anchor link of claim 7, wherein said large load bearing surface includes a lateral, convex curvature having a constant radius of curvature along said large load bearing surface.

17. The lading tie anchor link of claim 15, wherein said large load bearing surface includes a lateral, convex curvature having a constant radius of curvature along said large load bearing surface.

18. The lading tie anchor link of claim 3, wherein the large load bearing surface extends between lateral ends, and further including a guide flange disposed at or adjacent to each lateral end of said large load bearing surface.

19. The lading tie anchor link of claim 7, wherein the large load bearing surface extends between lateral ends, and further including a guide flange disposed at or adjacent to each lateral end of said large load bearing surface.

20. The lading tie anchor link of claim 9, wherein the large load bearing surface extends between lateral ends, and further including a guide flange disposed at or adjacent to each lateral end of said large load bearing surface.

21. The lading tie anchor link of claim 15, wherein the large load bearing surface extends between lateral ends, and further including a guide flange disposed at or adjacent to each lateral end of said large load bearing surface.

22. The lading tie anchor link of claim 3, wherein said large load bearing surface extends for greater than 180° and for not more than about 250°.

23. The lading tie anchor link of claim 9, wherein said large load bearing surface extends for greater than 180° and for not more than about 250°.

24. The lading tie anchor link of claim 3, wherein said intersection area has a nominal cross-sectional area and said large bearing surface has a cross-sectional area substantially larger than said nominal cross-sectional area.

25. The lading tie anchor link of claim 7, wherein said intersection area has a nominal cross-sectional area and said large bearing surface has a cross-sectional area substantially larger than said nominal cross-sectional area.

* * * * *